Oct. 31, 1950     A. J. HANSSEN     2,527,814
DIAPHRAGM MOTOR VALVE
Filed Sept. 12, 1946     2 Sheets-Sheet 1
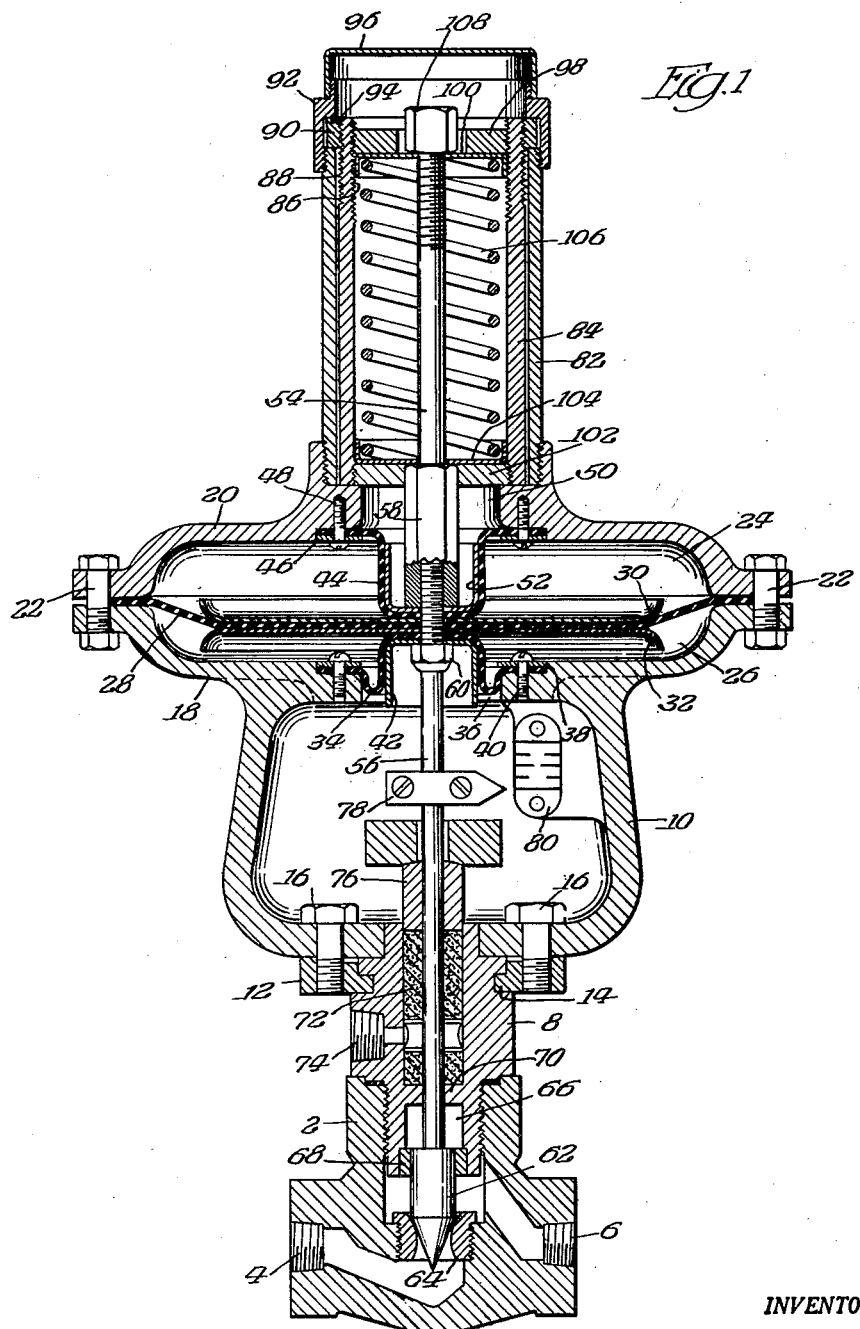
INVENTOR.
ALBERT J. HANSSEN

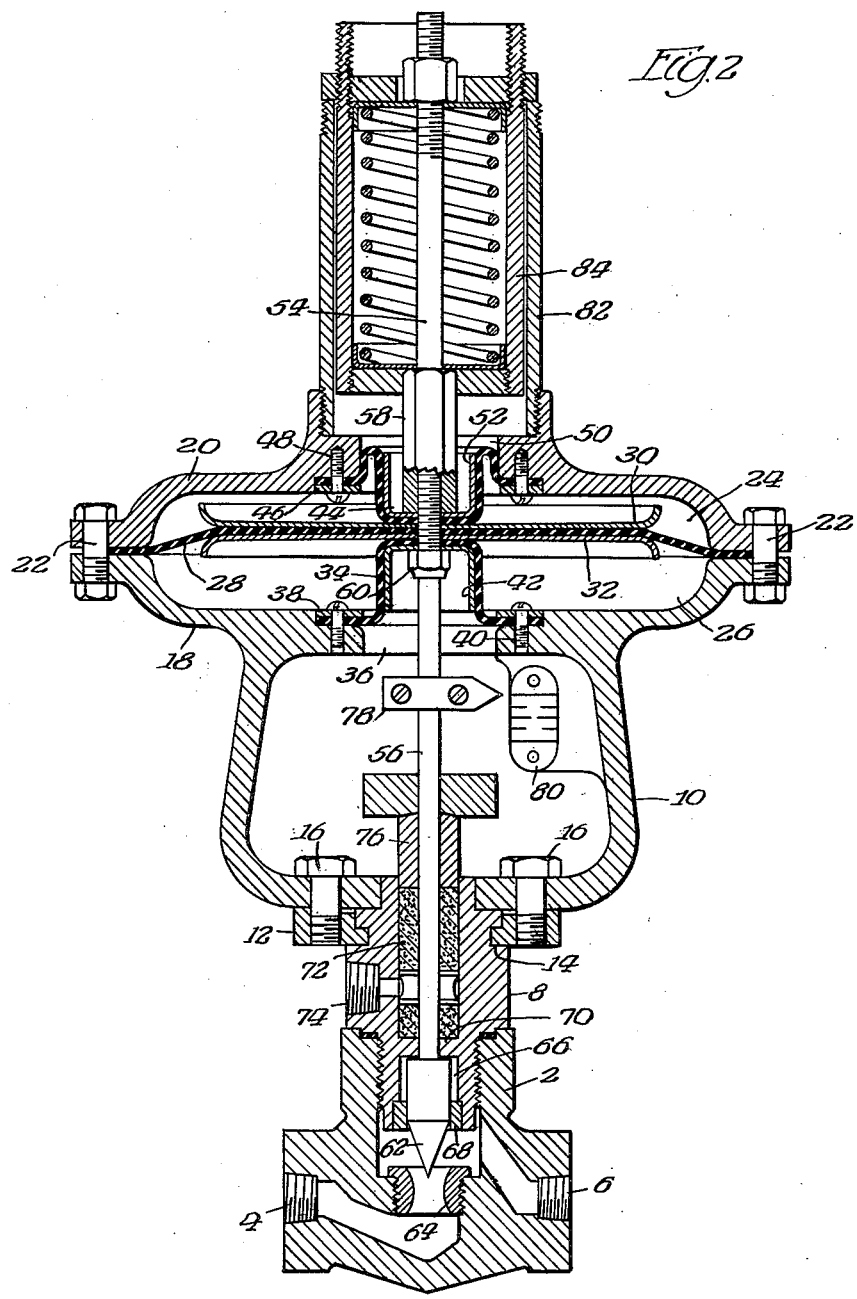

Patented Oct. 31, 1950

2,527,814

UNITED STATES PATENT OFFICE 2,527,814

DIAPHRAGM MOTOR VALVE

Albert J. Hanssen, Tulsa, Okla., assignor, by mesne assignments, to Black, Sivalls & Bryson, Inc., Kansas City, Mo., a corporation of Delaware Application September 12, 1946, Serial No. 696,465

5 Claims. (Cl. 137—153)

This invention relates in general to a diaphragm motor valve particularly adapted for use in pilot plants in the chemical, refinery, and power fields.

In diaphragm motor valves operated by pneumatic means for instruments or pilots, there are normally two types of valves desired, namely, the "air to open" valve and the "air to close" valve. Heretofore it has been necessary to manufacture either two types of bodies or two types of valve top works. This made it difficult to change the type of valve in the field and necessitated a number of additional parts and considerable labor.

This invention is designed to overcome the aforementioned disadvantages, whereby the valve can be easily changed from one type to another without necessitating either a change in the body of the valve or a change in the top works thereof.

One of the principal objects of the present invention is to provide a diaphragm motor valve which is so constructed as to be easily converted from an "air to open" valve to an "air to close" valve, or vice versa.

Another object is to provide a diaphragm motor valve having a reversible top works thereon, whereby the valve may be easily changed from an "air to open" position to an "air to close" position.

A further object is to provide a diaphragm motor valve wherein an air chamber has a diaphragm therein movable to two positions, one of which requires air to open the valve connected thereto and the other of which requires air to close the valve, together with means for moving the valve and diaphragm to either of its two positions for operation.

Other objects and advantages of the invention will become apparent upon a reading of the following description taken in connection with the accompanying drawings, in which:

Fig. 1 is a vertical sectional view through the diaphragm valve of the present invention, showing the valve normally closed and requiring air pressure to open; and Fig. 2 is a view similar to Fig. 1, but showing the position of the diaphragm and valve reversed, where the valve is normally open and requires air pressure to close.

Briefly described, the invention comprises a novel type of top works for a diaphragm motor valve, wherein the valve stem is connected to a diaphragm located within an air chamber and which extends upwardly into the top works. The diaphragm is capable of movement to either of two extreme positions. When the valve is normally closed, air pressure is admitted to one side of the air chamber for pressure against the diaphragm to open the valve. When it is desired to reverse this procedure, it is merely necessary to move the diaphragm to its opposite extreme position, whereby the valve is moved to a normally open position and requires air pressure against the opposite side of the diaphragm to close the valve.

An understanding of the operation of the invention may be had by referring more particularly to the drawings, wherein a valve body 2 of the usual construction is provided, with an inlet 4 and an outlet 6. The valve body has a central opening which is internally threaded at its upper part to threadedly receive the stuffing box body 8. A yoke 10 is secured to the upper part of the stuffing box body by means of a yoke lock ring 12, which is provided with an inwardly extending annular rib 14 adapted to be received in a suitable annular groove in the stuffing box body. The yoke and lock ring are then secured together by means of a plurality of bolts 16.

The upper part of the yoke 10 is enlarged, as at 18, to provide a partial housing. The housing is completed by means of the upper part 20 having a suitable flange thereon secured to a like flange on the lower housing 18 by means of the bolts 22. The space within the housing provides an air chamber, which may be conveniently designated as an upper air chamber 24 and a lower air chamber 26, separated by means of the flexible diaphragm 28. This diaphragm is adapted to be secured in place by inserting the edges thereof between the flanges on the upper and lower housing members 18 and 20, as shown.

Upper and lower diaphragm plates 30 and 32 are located centrally of the diaphragm and in contact with the upper and lower sides thereof. A sealing diaphragm 34 is located centrally of the lower diaphragm plate 32 and extends downwardly therefrom, a portion thereof being adapted to be received within the central opening 36 in the upper part of the yoke 10. A suitable annular groove surrounds the upper edge of the opening 36 to receive the edge of the sealing diaphragm 34 and a hold-down plate 38, both of which are suitably secured in place by means of the screws 40.

A seal cup 42 bears upwardly against the underside of the sealing diaphragm 34, the sides of which extend downwardly into the central opening 36.

The construction at the upper side of the diaphragm 28 is similar to that just described in providing a sealing diaphragm 44 secured at its edges against a similar annular groove by means of the hold-down plate 46 and the screws 48. The housing 20 is provided with a central opening 50, through which the various members may extend when the diaphragm is in its reversed position, and also to receive the seal cup 52 which bears downwardly against the sealing diaphragm 44 at the center thereof.

A valve stem extends substantially throughout the entire length of the valve body and, for convenience, may be referred to as the upper valve stem 54 and the lower valve stem 56. The upper valve stem is provided with a valve stem lock nut 58 adapted to be threadedly secured on the valve stem and to bear, at its lower end, against the seal cup 52, thus holding the seal cup and sealing diaphragm 44 securely against the diaphragm plate 30.

Another lock nut 60 is mounted on the lower valve stem 56 and is adapted to hold securely in place the seal cup 42, the sealing diaphragm 34, and the lower diaphragm plate 32.

The lower end of the lower valve stem 56 is provided with a valve 62 of any suitable configuration. This valve is adapted to seat within the seat ring 64 suitably secured in place between the inlet and outlet of the valve body.

The lower end of the stuffing box body 8 is provided with a central opening 66, within which the guide bushing 68 is adapted to be received and acts as a guide for the valve 62. The central opening through the stuffing box body has an annular, inwardly extending rib 70 near the lower end thereof, adapted to receive the lower valve stem and aid in guiding the valve in the axial movement thereof.

Above the rib 70 and within the central opening, a quantity of packing 72 is located around the lower valve stem, and the stuffing box body is provided with a suitable opening 74 within which grease may be placed for properly lubricating the moving parts. A packing follower 76 is located above the packing 72, and above this packing follower a travel pointer 78 is secured to the lower valve stem. One end of the pointer is located adjacent the travel indicator plate 80 in order to indicate the length of travel of the valve stem and the valve carried thereby.

The novel reversible top works of the present invention includes a spring case housing 82 adapted to be threadedly secured to the upper part of the upper housing 20. Within the spring case housing is located the spring case 84, which is adapted to be movable longitudinally thereof when it is desired to change the valve from "air to open" to "air to close." Normally, in either position of the valve this spring case 84 remains stationary, but when it is desired to convert the valve, then this case may be movable, as will be more clearly brought out hereinafter.

The upper end of the spring case 84 is provided with internal threads 86 and external threads 88. A valve positioning screw 90 is adapted to be threadedly connected to the outer side of the spring case 84, and is adapted to bear downwardly against the upper edge of the spring case housing 82, thus preventing any downward movement of the case 84. A lock nut 92 is threadedly secured to the upper end of the spring case housing 82 and is provided with an annular shoulder 94 adapted to bear downwardly against the upper side of the valve positioning screw 90, thus preventing any upward movement of the case 84. A cap 96 may be secured to the lock nut 92 for covering the upper end of the top works.

An upper spring stop 98 is adapted to engage the internal threads 86 of the case 84 and is located adjacent the upper end thereof, so that a spring seat 100 may be located within the spring case and normally bear upwardly against the underside of the spring stop 98. The lower end of the case 84 is provided with a similar spring stop 102, against which the lower spring seat 104 may normally rest. A coiled compression spring 106 surrounds the upper valve stem 54 and bears at its upper end against the spring seat 100 and at its lower end against the spring seat 104. A spring adjusting nut 108 threadedly engages the upper end of the upper valve stem 54 and is adapted to bear against the upper spring seat 100, to thereby adjust the compression of the spring 106.

In the operation of the device in the normal position shown in Fig. 1, air from any suitable pneumatic means will be admitted to the lower chamber 26 to force the diaphragm 28 upwardly, carrying with it the valve 62, to thereby open the valve. It is to be noted that the valve stem lock nut 58 is so positioned as to bear upwardly against the lower spring seat 104, so that any tendency of the diaphragm to move upwardly under air pressure will be opposed or resisted by the spring 106. This construction assumes that a suitable opening in the upper air chamber 24 is provided so that the diaphragm is able to breathe.

In converting the valve of this invention from the "air to open" position of Fig. 1 to the "air to close" position shown in Fig. 2, it is merely necessary to remove the lock nut 92 from the upper end of the top works. This will permit an upward movement of the spring case 84, carrying with it the upper valve stem, the diaphragm, the lower valve stem and the valve connected thereto. This upward movement of the spring case may be carried out manually by lifting the case upwardly or by screwing the valve positioning screw 90 downwardly, or a small amount of air pressure may be exerted against the underside of the diaphragm, which will automatically elevate the diaphragm to its upper extreme position, as shown in Fig. 2. Regardless of the specific manner in which this adjustment is carried out, when the diaphragm reaches its uppermost position the positioning screw 90 may then be rotated downwardly to a position where it again contacts and bears against the upper edge of the spring case housing 82, thus preventing a downward movement of the case 84 and the parts carried thereby. When the diaphragm has reached this uppermost position, the lock nut 92 may be replaced and the air supply conduit may be removed from the lower air chamber 26 and connected to the upper air chamber 24. Such pneumatic means are common and well known to those skilled in the art and need not be shown in connection with the present invention.

When the diaphragm and valve have reached their upper extreme position, as shown in Fig. 2, it then becomes an "air to close" valve. When air pressure is applied to the upper air chamber 24 for purposes of closing the valve, the diaphragm will tend to move downwardly, but will do so against the compression of the spring 106 by reason of the upper adjusting nut 108 bearing against the upper spring seat 100. Downward movement of the diaphragm will carry with it the upper and lower valve stems and the adjusting nut 108 connected thereto. Since this nut bears downwardly against the spring seat 100, any downward movement of the valve stem will compress the spring 106. In the upper position of the various parts it will be noted that the travel pointer 78 has become alined with the upper limit of the travel indicator plate, so that any downward or closing movement of the valve will thus be indicated thereby.

It will be evident that the invention may take other specific forms, but an additional advantage which has been found to be present in the construction illustrated herein and described above is the fact that the spring tension can be adjusted with air pressure in the diaphragm chamber by merely removing the cover 96 and adjusting the nut 108.

The present construction also obviates the necessity for a stuffing box or other expensive types of seats on the diaphragm chambers, it being merely necessary to provide a simple rubber seal and seal cup fastened between the diaphragm case and the valve stem, as above outlined. The seal is designed to close off the air pressure absolutely, and yet permits a free rolling action between the seal cup and the diaphragm case, offering very little resistance since no friction is offered between the stem and the diaphragm case.

From the foregoing description it will be evident that I have provided a novel diaphragm motor valve having the unique feature of reversibility in the top works thereof for converting an "air to open" valve to an "air to close" valve by a very simple procedure. It will be clear to those skilled in the art that changes may be made in the form, construction and arrangement of the parts from that disclosed herein without in any way departing from the spirit of the invention or sacrificing any of the attendant advantages thereof. It is contemplated that the present invention is adapted to cover such changes, provided they fall within the scope of the claims appended hereto.

Having thus described my invention what I claim as new and desire to secure by Letters Patent of the United States is:

1. In a diaphragm motor valve structure having a body with an air inlet and an air outlet therein, biasing means for the diaphragm comprising a casing movable in a direction substantially perpendicular to the diaphragm, a stem within said casing and connected with the diaphragm, said stem and diaphragm being movable with respect to said casing, connecting means between said casing and said stem at each end of the casing, whereby movement of the casing in either direction will carry with it said stem, and yieldable means in said casing to resist movement of the diaphragm by air pressure from either of its extreme positions.

2. In a diaphragm motor valve structure having a body with an air inlet and an air outlet therein, biasing means for the diaphragm comprising a casing movable in a direction substantially perpendicular to the diaphragm, a stem within said casing and connected with the diaphragm, said stem and diaphragm being movable with respect to said casing, connecting means between said casing and said stem at each end of the casing, whereby movement of the casing in either direction will carry with it said stem, means to lock said casing in either of two extreme positions, and yieldable means in said casing to resist movement of the diaphragm by air pressure from either of its extreme positions.

3. In a diaphragm motor valve structure having a body with an air inlet and an air outlet therein, biasing means for the diaphragm comprising a casing movable in a direction substantially perpendicular to the diaphragm, a stem within said casing and connected with the diaphragm, said stem and diaphragm being movable with respect to said casing, a closure member at each end of said casing, an opening through each said closure member to receive said stem, a bearing plate adjacent the inner side of each closure member and having an opening therein for the reception of said stem, spaced bearing portions on said stem, one of said bearing plates bearing downwardly on one of said bearing portions and the other of said bearing plates bearing upwardly against the other of said bearing portions, and yieldable means in said casing urging said bearing plates in opposite directions, whereby movement of the casing in either direction will carry with it said stem, said yieldable means also resisting movement of the diaphragm by air pressure from either of its extreme portions.

4. In a diaphragm motor valve structure having a body with an air inlet and an air outlet therein, biasing means for the diaphragm comprising a casing movable in a direction substantially perpendicular to the diaphragm, a stem within said casing and connected with the diaphragm, said stem and diaphragm being movable with respect to said casing, connecting means between said casing and said stem whereby movement of said casing in one direction will carry with it said stem, other connecting means between said casing and said stem whereby movement of said casing in the other direction will also carry with it said stem, and yieldable means in said casing to resist movement of the diaphragm by air pressure from either of its extreme positions.

5. In a diaphragm motor valve structure having a body with an air inlet and an air outlet therein, biasing means for the diaphragm comprising a casing movable in a direction substantially perpendicular to the diaphragm, a stem within said casing and connected with the diaphragm, said stem and diaphragm being movable with respect to said casing, connecting means between said casing and said stem whereby movement of said casing in one direction will carry with it said stem, other connecting means between said casing and said stem whereby movement of said casing in the other direction will also carry with it said stem, and a coiled spring surrounding said stem within said casing to resist movement of the diaphragm by air pressure from either of its extreme positions.

ALBERT J. HANSSEN.

REFERENCES CITED

The following references are of record in the file of this patent:

UNITED STATES PATENTS

| Number | Name | Date |
|---|---|---|
| 607,265 | McLean | July 12, 1898 |
| 1,204,687 | Roder | Nov. 14, 1916 |
| 1,620,322 | Browne | Mar. 8, 1927 |
| 2,162,779 | Lentwiler | June 20, 1939 |